(12) United States Patent
Mizusako (10) Patent No.: US 7,576,813 B2
(45) Date of Patent: Aug. 18, 2009

(54) LIQUID CRYSTAL DEVICE AND PROJECTOR

(75) Inventor: Kazuhisa Mizusako, Chino (JP)

(73) Assignee: Seiko Epson Corporation, Tokyo (JP)

( * ) Notice: Subject to any disclaimer, the term of this patent is extended or adjusted under 35 U.S.C. 154(b) by 382 days.

(21) Appl. No.: 11/618,025

(22) Filed: Dec. 29, 2006

(65) Prior Publication Data

US 2007/0182890 A1 Aug. 9, 2007

(30) Foreign Application Priority Data

Feb. 8, 2006 (JP) ............... 2006-030603

(51) Int. Cl.
*G02F 1/1335* (2006.01)

(52) U.S. Cl. ........................... 349/95; 349/5

(58) Field of Classification Search ................ 349/5–8, 349/95, 110; 359/619, 625; 348/751; 353/122
See application file for complete search history.

(56) References Cited

U.S. PATENT DOCUMENTS

| | | | | |
|---|---|---|---|---|
| 5,757,341 A | * | 5/1998 | Clarke et al. .............. | 345/32 |
| 5,764,318 A | * | 6/1998 | Kurematsu et al. ......... | 349/5 |
| 6,680,762 B2 | * | 1/2004 | Fukuda et al. ............. | 349/95 |
| 6,894,480 B2 | * | 5/2005 | Back ....................... | 324/158.1 |
| 7,321,349 B2 | * | 1/2008 | Fukuda et al. ............. | 345/84 |

FOREIGN PATENT DOCUMENTS

| | | |
|---|---|---|
| JP | A 05-249454 | 9/1993 |
| JP | A 09-127496 | 5/1997 |
| JP | A 2001-147305 | 5/2001 |
| JP | A-2004-021209 | 1/2004 |
| JP | A-2005-181607 | 7/2005 |
| JP | A 2005-215122 | 8/2005 |

* cited by examiner

*Primary Examiner*—Dung Nguyen
*Assistant Examiner*—Tai Duong
(74) *Attorney, Agent, or Firm*—Oliff & Berridge, PLC (57) ABSTRACT

There is provided a liquid crystal device that displays an image through a liquid crystal. The liquid crystal device includes: a plurality of pixels that constitutes the image; a light-shielding film disposed between the plurality of pixels; an opening provided at the light-shielding film; an open surface including the opening; and a plurality of condensers provided for the plurality of pixels, the condensers collecting light rays incident on the liquid crystal into the center of the respective pixels. A ratio C/P satisfies the relation $1<C/P<2.5$ where P is the diagonal length of the pixel, C is the distance between A and B, where A is the intersection point between the optical axis of the light incident on the center of the pixel and the open surface, and B is the farthest point of the condenser on the optical axis from the intersection point A.

3 Claims, 7 Drawing Sheets

LIQUID CRYSTAL DEVICE AND PROJECTOR

BACKGROUND

1. Technical Field

The present invention relates to a liquid crystal device and a projector.

2. Related Art

Protectors are finding increasing home use. The spatial light modulators of projectors are therefore required to provide high-contrast images at low cost, with long life and high light-use efficiency. A typical example of the spatial light modulators is a liquid crystal device. The liquid crystal device has various wires such as data lines, scanning lines, capacitor lines and various electronic elements such as thin-film transistors and thin-film diodes in its image display region. Accordingly, the region of pixels where the light contributing to displaying images can pass through or reflect is restricted by the presence of the wires and electronic elements. The open area ratio of each pixel is defined by the area ratio of each pixel to an area where the light contributing to displaying images can pass through or reflect, that is, an open area. The open area ratio of liquid crystal devices is generally about 70 percent. The light from a light source into the liquid crystal device passes through or reflects by a liquid crystal layer in the state of parallel light rays. Accordingly, when liquid crystal devices are irradiated by parallel light rays, of all light, only an amount of light corresponding to the open area ratio of the pixels is available, and unavailable light becomes a loss.

Therefore, a condenser such as a microlens is generally provided at the opposing substrate of a liquid crystal device, with which the light incident on the liquid crystal device is condensed inside the light-shielding film (the open area of pixels (for example, refer to JP-A-9-127496). The microlens condenses the illumination light from a light source into an open area on a pixel basis. The illumination light condensed by the microlens can efficiently pass through the pixel open area. Accordingly, the use of the microlens array for liquid crystal devices reduces light loss by a light-shielding film, improving light use efficiency.

Such liquid crystal devices are required to have higher definition, higher quality, and higher luminosity. This increases a need for decreasing the pixel pitch. In this case, it is absolutely necessary to optimize the shape of the condenser. For example, JP-A-9-127496 discloses a method for condensing light with an aspheric microlens (in elliptical spherical shape or rotating hyperboloid shape) with a spherical aberration of zero, as mean for improving condensing efficiency. However, examinations by the inventor et al. show that factors of great significance for the condensing efficiency of narrow-pitch liquid crystal devices are control of the distance from the microlens to the light-shielding film as well as the design of the optimum shape of the condenser. For example, thinly etched microlens substrate will be varied in thickness, so that the distance from the microlens to the light-shielding film will also be varied. As a result, the condensing efficiency will also be varied.

SUMMARY

An advantage of some aspects of the invention is that here is provided a liquid crystal device, which is decreasing in pixel pitch, and a projector with high condensing efficiency. Particularly, optimization of the size of the pixels and the distance from the condenser to the light-shielding film, even if any of them varies, offers a liquid crystal device and a projector capable of light image display with improved and stable condensing efficiency.

According to a first aspect of the invention, there is provided a liquid crystal device that displays an image through a liquid crystal. The liquid crystal device comprises: a plurality of pixels that constitutes the image; a light-shielding film disposed between the plurality of pixels; an opening provided at the light-shielding film; an open surface including the opening; and a plurality of condensers provided for the plurality of pixels, the condensers collecting light rays incident on the liquid crystal into the center of the respective pixels. A ratio C/P satisfies the relation 1<C/P<2.5 where P is the diagonal length of the pixel, C is the distance between A and B, where A is the intersection point between the optical axis of the light incident on the center of the pixel and the open surface, and B is the farthest point of the condenser on the optical axis from the intersection point A. This structure allows higher-definition liquid crystal devices to display light images with high collection efficiency. Moreover, the substantially constant collection efficiency provides a stable characteristic regardless of fluctuations in ratio C/P. Experimental data and so on will be described in the following embodiments.

For the condenser of the invention, various optical elements can be used. Typical examples include a dioptric element such as a microlens, and also include a reflecting optical element or a diffracting optical element. The reflecting optical element and the diffracting optical element have the same advantages as the dioptric element except that they guide light inside a light-shielding film by reflecting and diffracting light, respectively. Although the invention will be described for an example in which the dioptric element is used as a condenser, the invention is not limited to that.

The condenser includes the following three types: (1) a case in which the cross section of the condenser taken along a plane including the optical axis has a refracting surface curved around the outer periphery of the light incident side; (2) a case in which the cross section of the condenser taken along a plane including the optical axis has a refracting surface whose incident side outer periphery forms straight lines; (3) a case in which a part of the cross section taken along a plane including the optical axis is the refracting surface of (1) and the other part is the refracting surface of (2). The condenser of the invention may have any of the shapes of (1) to (3).

According to a second aspect of the invention, there is provided a projector comprising the above-described liquid crystal device as a spatial-light modulator.

BRIEF DESCRIPTION OF THE DRAWINGS

The invention will be described with reference to the accompanying drawings, wherein like numbers reference like elements.

DESCRIPTION OF EXEMPLARY EMBODIMENTS

Projector

Figure 1:
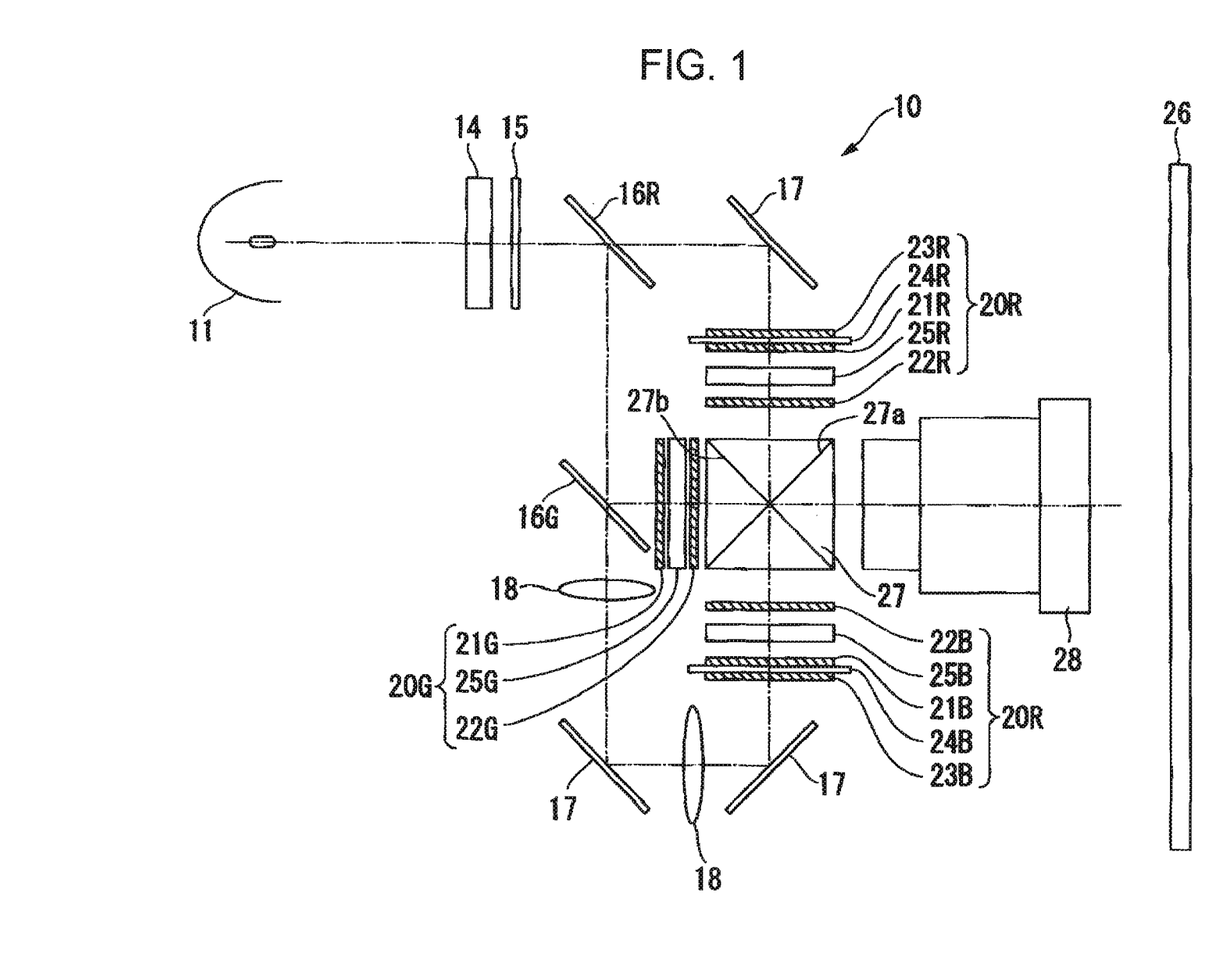
FIG. 1 is a schematic diagram of a projector.

FIG. 1 is a schematic diagram of a projector, denoted by numeral 10, according to an embodiment of the invention. The projector 10 is a front projector that applies light to a screen 26 disposed on a viewer side so that the viewer can view an image by viewing the light reflected by the screen 26. A light source 11 is an ultrahigh-pressure mercury lamp that supplies light including red light (hereinafter, referred to as R light) green light (hereinafter, referred to as G light), and blue light (hereinafter, referred to as B light). An integrator 14 uniformizes the illumination distribution of the light from the light source 11. The light whose illumination distribution is uniformized is converted to polarized light in a specific vibrating direction, for example, s-polarized light, by a polarization conversion element 15. The light converted to s-polarized light enters an R-light transmissive dichroic mirror 16R that configures a color separation system.

The R-light transmissive dichroic mirror 16R transmits R light and reflects G light and B light. The R light that has passed through the R-light transmissive dichroic mirror 16R enters a reflection mirror 17. The reflection mirror 17 bends the optical path of the R light at 90 degrees. The R light whose optical path is bent enters a spatial-light modulator 20R that modulates the R light in response to an image signal. The spatial-light modulator 20R is a transmissive liquid crystal device that modulates R light in response to an image signal. The R light to be incident on the spatial-light modulator 20R remains the s-polarized light because the direction of polarization does not change ever through the R-light transmissive dichroic mirror 16R.

The spatial-light modulator 20R includes a λ/2-retarder 23R, a glass plate 24R, a first polarizer 21R, a liquid crystal panel 25R, and a second polarizer 22R. The λ/2-retarder 23R and the first polarizer 21R are disposed in contact with the light-transmissive glass plate 24R that does not change the direction of polarization. This prevents the problem of distortion of the first polarizer 21R and the λ/2-retarder 23R due to heat. Referring to FIG. 1, the second polarizer 22R is separate; however, it may be disposed in contact with the exiting surface of the liquid crystal panel 25R or the incident surface of a cross dichroic prism 27.

The s-polarized light incident on the spatial-light modulator 20R is converted to p-polarized light by the λ/2-retarder 23R. The R light converted to p-polarized light passes through the glass plate 24R and the first polarizer 21R as it is and enters the liquid crystal panel 25R. The p-polarized light incident on the liquid crystal panel 25R is modulated in response to an image signal, so that the R light is converted to s-polarized light. The R light converted to s-polarized light by the liquid crystal panel 25R is let out from the second polarizer 22R. Thus the R light modulated by the spatial-light modulator 20R enters the cross dichroic prism 27 serving as a color combining system.

The G light and B light reflected by the R-light transmissive dichroic mirror 16R are bent in optical path at 90 degrees. The bent G light and B light enter a B-light transmissive dichroic mirror 16G. The B-light transmissive dichroic mirror 16G reflects G light and allows B light to pass through. The G light reflected by the B-light transmissive dichroic mirror 16G enters a spatial-light modulator 20G that converts G light in response to an image signal. The spatial-light modulator 20G is a transmissive liquid crystal device that modulates G light in response to an image signal. The spatial-light modulator 20G includes a liquid crystal panel 25G, a first polarizer 21G, and a second polarizer 22G.

The G light incident on the spatial-light modulator 20G has been converted to s-polarized light. The s-polarized light incident on the spatial-light modulator 20G passes through the first polarizer 21G as it is and enters the liquid crystal panel 25G. The s-polarized light incident on the liquid crystal panel 25G is modulated in response to an image signal, so that the G light is converted to p-polarized light. The G light converted to p-polarized light by the liquid crystal panel 25G is let out from the second polarizer 22G. Thus the G light modulated by the spatial-light modulator 20G enters the cross dichroic prism 27 serving as a color combining system.

The B light that has passed through the B-light transmissive dichroic mirror 16G enters a spatial-light modulator 20B that modulates B light in response to an image signal via two relay lenses 18 and two reflection mirrors 17. The spatial-light modulator 20B is a transmissive liquid crystal device that modulates B light in response to an image signal. The reason that B light is made pass through the relay lenses 18 is that the optical path of the B light is longer than those of the R light and the G light. The use of the relay lenses 18 allows the B light that has passed through the B-light transmissive dichroic mirror 16G to be guided to the spatial-light modulator 20B. The spatial-light modulator 20B includes a λ/2-retarder 23B, a glass plate 24B, a first polarizer 21B, a liquid crystal panel 25B, and a second polarizer 22B. The structure of the spatial-light modulator 20B is the same as that of the spatial-light modulator 20R.

The B light incident on the spatial-light modulator 20B has been converted to s-polarized light. The s-polarized light incident on the spatial-light modulator 20B is converted to p-polarized light by the λ/2-retarder 23B. The B light converted to the p-polarized light passes through the glass plate 24B and the first polarizer 21B as it is and enters the liquid crystal panel 25B. The p-polarized light incident on the liquid crystal panel 25B is modulated in response to an image signal, so that the B light is converted to s-polarized light. The B light converted to s-polarized light by the liquid crystal panel 25B is let out from the second polarizer 22B. Thus the B light modulated by the spatial-light modulator 20B enters the cross dichroic prism 27 serving as a color combining system. The R-light transmissive dichroic mirror 16R and the B-light transmissive dichroic mirror 16G that configure a color separation system separate the light supplied from the light source 11 into R light, G light, and B light.

The cross dichroic prism 27 which is a color combining system has two dichroic films 27a and 27b intersecting at right angles in X-shape. The dichroic film 27a reflects B light and transmits G light. The dichroic film 27b reflects R light and transmits G light. Thus, the cross dichroic prism 27 combines the R light, C light, and B light that are modulated by the spatial-light modulator 20R, the spatial-light modulator 20G, and the spatial-light modulator 20B, respectively. A projection system 28 including a projection lens projects the light combined by the cross dichroic prism 27 onto the screen 26. Thus, a full-color image can be displayed on the screen 26.

The light incident on the cross dichroic prism 27 from the spatial-light modulator 20R and the spatial-light modulator 20B is set so as to become s-polarized light. The light incident on the cross dichroic prism 27 from the spatial-light modulator 20G is set so as to become p-polarized light. By differentiating the directions of polarization of the lights incident on the cross dichroic prism 27, the light let out from the spatial-light modulators can be effectively combined by the cross dichroic prism 27. The dichroic films 27a and 27b generally have high s-polarized-light reflecting characteristic. Accordingly, the R light and B light reflected by the dichroic films 27a and 27b are set to become s-polarized light, while the G light that passes through the dichroic films 27a and 27b is set to become p-polarized light.

Liquid Crystal Panel 1

The liquid crystal panel 25R according to the first embodiment of the invention will be described.

Figure 2:
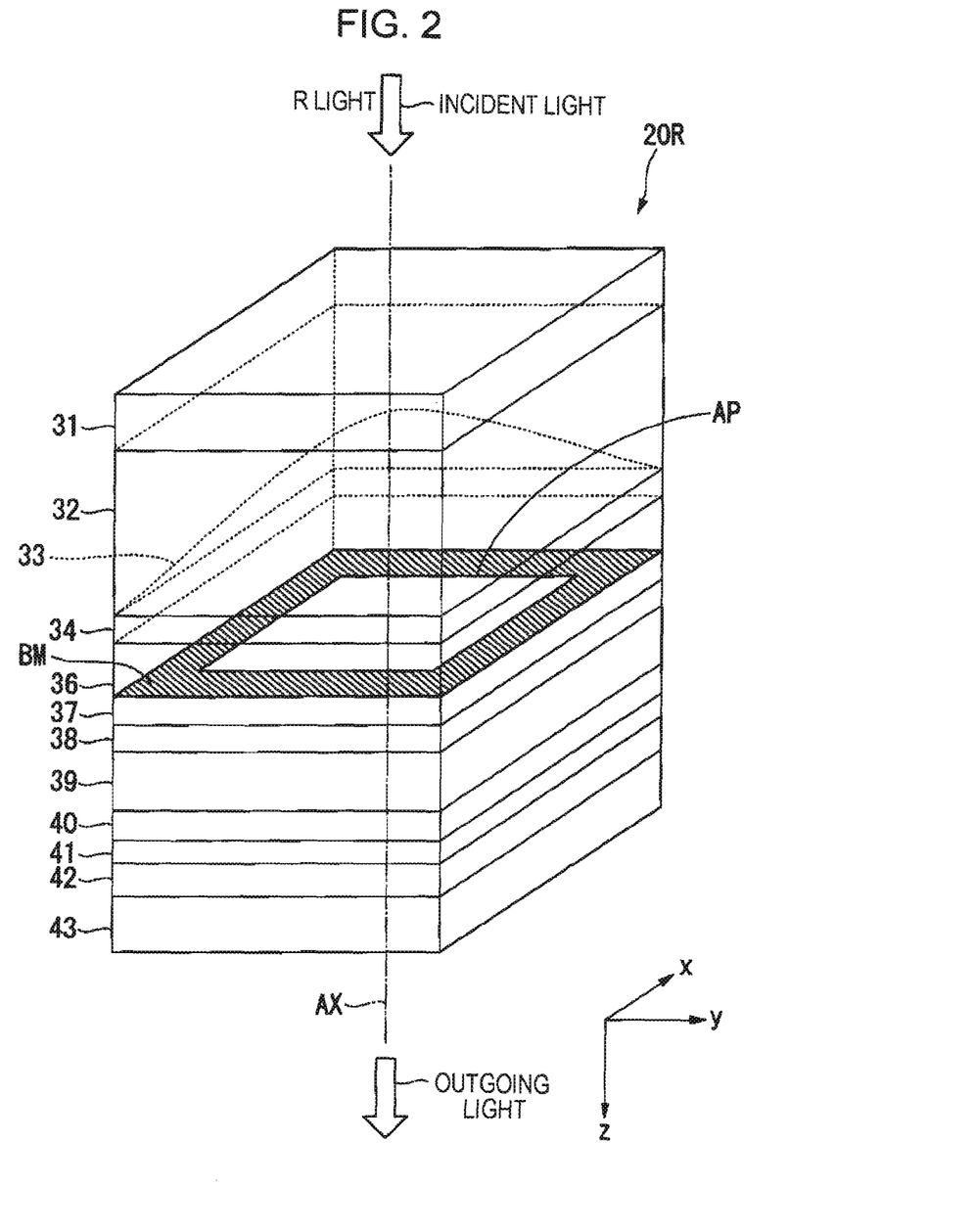
FIG. 2 is a partial perspective view showing the structure of a pixel of the liquid crystal device of a first embodiment.

FIG. 2 is a schematic perspective view showing the structure of the essential part of the liquid crystal panel 25R. The projector 10 described in FIG. 1 includes three liquid crystal panels 25R, 25G, and 25B. The difference among t three liquid crystal panels 25R, 25G, and 25B is only the wavelength range of light to be modulated but their basic structures are the same. Accordingly, the liquid crystal panel 25R will be described as a typical example. An open area AP is for one pixel. FIG. 2 shows only a part corresponding to one pixel of the liquid crystal panel 25R.

The R light from the light source 11 enters the liquid crystal panel 25R and exits from below toward the screen 26. A microlens array substrate 32 is disposed on the exiting side of an incident-side dustproof glass plate 31. The microlens array substrate 32 is bonded to an opposing substrate 36 with an adhesive layer 34. The surface of the microlens array substrate 32 adjacent to the opposing substrate 36 has a concave surface. The adhesive layer 34 disposed in the concave surface forms a microlens 33 which is a dioptric element.

The microlens 33 is disposed for one open area AP. The microlens 33 functions as a condenser for collecting the light rays from the light source 11 into a corresponding open area AP, or the center of a corresponding pixel. For the whole liquid crystal panel 25R, multiple microlenses 33 are disposed in matrix form for multiple open areas AP. The multiple microlenses 33 arranged in matrix form constitute a microlens array.

The opposing substrate 36 including a transparent electrode 37 having an indium tin oxide (ITO) film is disposed on the exiting side of the microlens 33. Between the opposing substrate 36 and the transparent electrode 37, a black matrix (light-shielding film) BM is disposed. The black matrix BM is disposed in the form of a lattice across the boundary of pixels in such a manner as to partition multiple pixels in matrix form. The black matrix BM has a rectangular open area (opening) AP corresponding to the pixel. On the exiting side of the transparent electrode 37, an alignment film 38 subjected to specified alignment such as rubbing is disposed. The alignment film 38 is made of a transparent organic film made of polyimide or the like.

A TFT substrate 42 is provided on the incident side of an exiting-side dustproof plate 43. The incident side of the TFT substrate 42A has a transparent electrode and a TFT layer 41. The incident side of the TFT layer 41 has an alignment film 40. The alignment films 38 and 40 are disposed such that their respective rubbing directions intersect substantially. The incident-side dustproof plate 31 and the exiting-side dustproof plate 43 are bonded together with the opposing substrate 36 and the TFT substrate 42 opposed to each other. Between the opposing substrate 36 and the TFT substrate 42 is sealed a liquid crystal layer 39.

The structure shown in FIG. 1 has the first polarizer 21R and the second polarizer 22R separate from the liquid crystal panel 25R. Alternatively, a polarizer may be disposed between the incident-side dustproof plate 31 and the opposing substrate 36 or between the exiting-side dustproof plate 43 and the TFT substrate 42.

Figure 3:
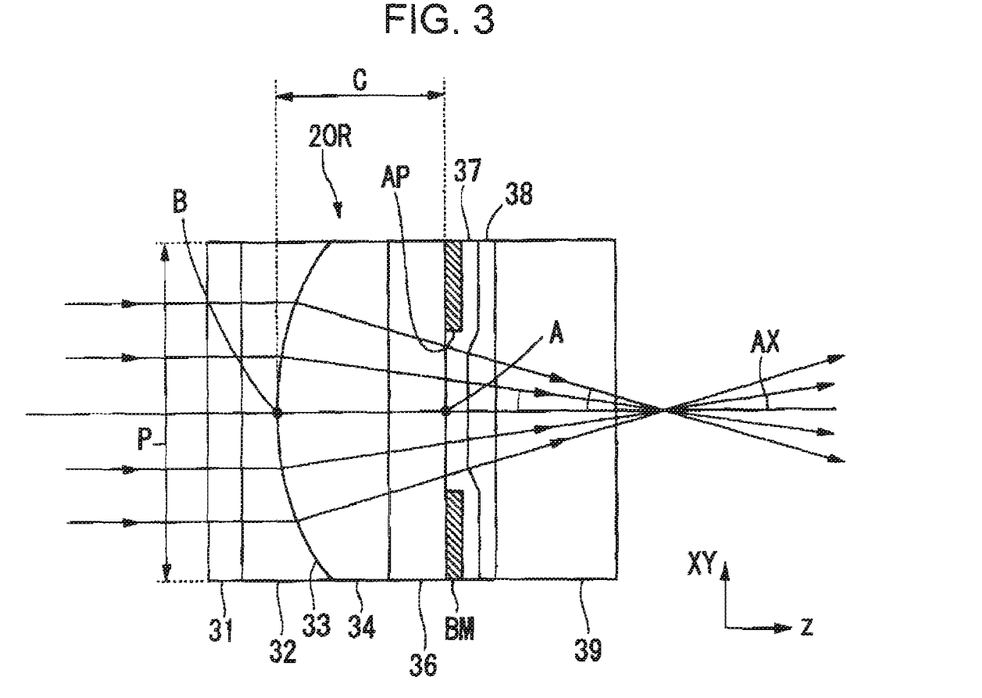
FIG. 3 is a schematic cross sectional view for describing the structure and operation of a condenser.

Referring to FIG. 3, the structure and operation of the microlens 33 will be described.

FIG. 3 is a schematic diagram of the structure from the incident-side dustproof plate 31 to the liquid crystal layer 39 of the liquid crystal panel 25R.

As shown in FIG. 3, the surface of the microlens array substrate 32 adjacent to the opposing substrate 36 has a substantially hemispherical concave surface, in which an optically transparent adhesive layer 34 is charged to form the microlens 33. Substantially parallel incident light rays are refracted according to the difference in refractive indexes between the microlens array substrate 32 and the adhesive layer 34 to be condensed so as to pass through the open area AP of the black matrix BM. The shape of the microlens 33 (the shape of the concave surface or refracting interface), the refractive index of the microlens array substrate 32, and the refractive index of the adhesive layer 34 are appropriately set so that refracted right can efficiently pass through the open area AP.

The distance C between the microlens 33 and the black matrix BM Is designed to an appropriate value according to a pixel pitch P. Specifically, the distance C is designed so that the ratio C/P of the distance C to the diagonal length P of the pixel satisfies $0.5<C/P<3$, and more preferably, $1<C/P<2.5$ where C is the distance between A and B, A is the intersection point of the optical axis AX of light incident on the center of the pixel and the opening plane of the black matrix BM (the plane having the black matrix BM and the open area AP), B is the point on the optical axis AX of the microlens 33 farthest from point A (that is, the point on the optical axis AX of the microlens 33 nearest to the light incident side. This enables higher-definition liquid crystal devices to display light images with high collection efficiency. The reason will be described with reference to the embodiments.

First Embodiment

Figure 4:
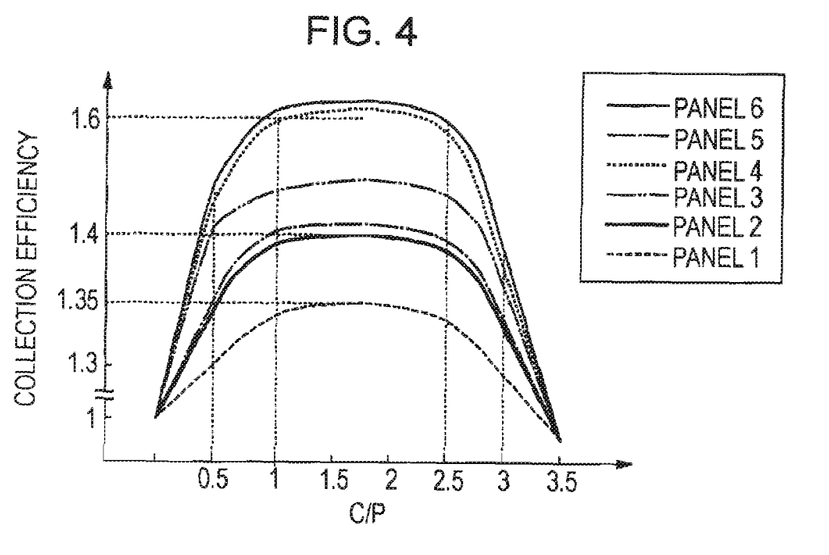
FIG. 4 is a graph of simulation results showing the relationship between collection efficiency and the ratio C/P.

FIG. 4 is a graph showing the relationship between the ratio C/P and collection efficiency. The collection efficiency is simulations of the collection efficiencies of panels (panels 1 to 6) when pixel pitch p, the refractive index n of the adhesive layer 34, and the focal value f of the projection lens are varied. Table 1 shows the conditions of the simulation for the panels. They are calculated on the assumption that the pixel is square in shape and the diagonal length P of the pixel is $p \times \sqrt{2}$. The open area ratio for a pixel with a pixel pitch p of 8 μm is 45 percent, and that for a pixel pitch p of 15 μm is 55 percent. The refraction index n0 of the microlens array substrate 32 is 1.46.

TABLE 1

|  | Pixel Pitch p (μm) | Refractive Index n of Adhesive | Focal Value f of Projection Lens |
|---|---|---|---|
| Panel 1 | 15 | 1.59 | 2 |
| Panel 2 | 8 | 1.59 | 2 |
| Panel 3 | 15 | 1.59 | 1.5 |
| Panel 4 | 8 | 1.59 | 1.5 |
| Panel 5 | 15 | 1.62 | 1.5 |
| Panel 6 | 8 | 1.62 | 1.5 |

As shown in FIG. 4, the collection efficiencies of panels 1 to 6 exhibit a drooping characteristic in which around the ratio C/P=1.75 is the maximum. When the ratio C/P is 1.75 or less, the collection efficiencies of all the panels increase as the ratio C/P increases, and when the ratio C/P exceeds 1.75, it decrease as the ratio C/P increases. This tendency increases with a decreasing pixel pitch of panels. This will be understood by the comparison between panels 1 and 2, panels 3 and 4, and panels 5 and 6. The panels 3 and 4 and panels 5 and 6 are changed in focal value f and refractive index n from panels 1 and 2, respectively. Even with the parameters varied, similar tendency is shown. Therefore, such changes in collection efficiency may occur irrespective of pixel pitch p, focal value f, and refractive index n.

With ratios C/P ranging from 0.5 to 3, almost stable collection efficiency can be provided. Particularly, with ratios C/P ranging from 1 to 2.5, the collection efficiency is stable on a high level, which shows little changes even if the ratio C/P fluctuates. Thus, setting the ratio C/P in the range of 0.5<C/P<3, or more preferably, 1<C/P<2.5, allows a projector with light and stable display quality to be provided.

Although not shown, exactly the same simulation results are given for rectangular pixels. That is, for a rectangular subpixel with an aspect ratio of 1 to 3 for color display, light display with high collection efficiency can be provided by setting the ratio C/P in the range of 0.5<C/P<3, or more preferably, 1<C/P<2.5.

Figure 5A:
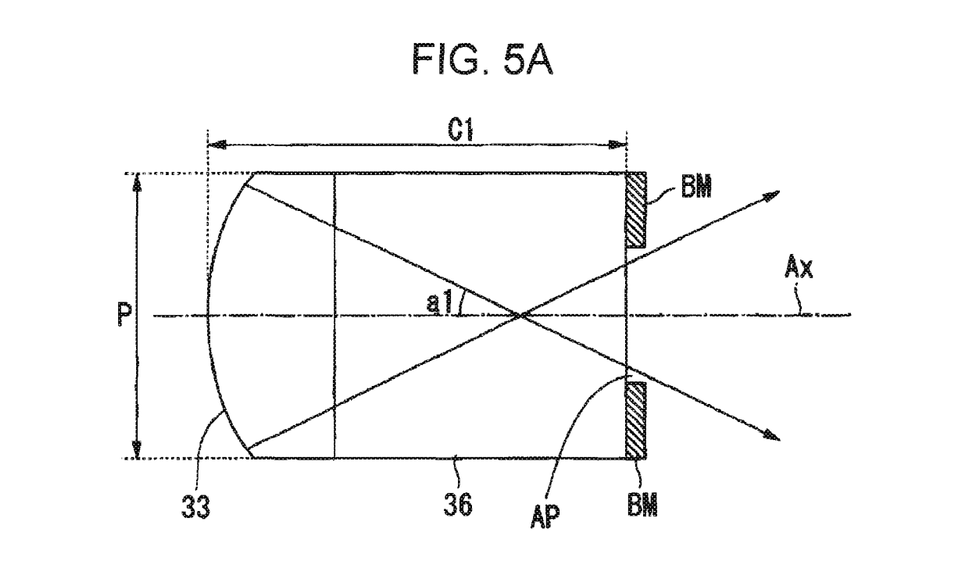
FIG. 5A is an explanatory diagram of the relationship between collection efficiency and the ratio C/P.
Figure 5B:
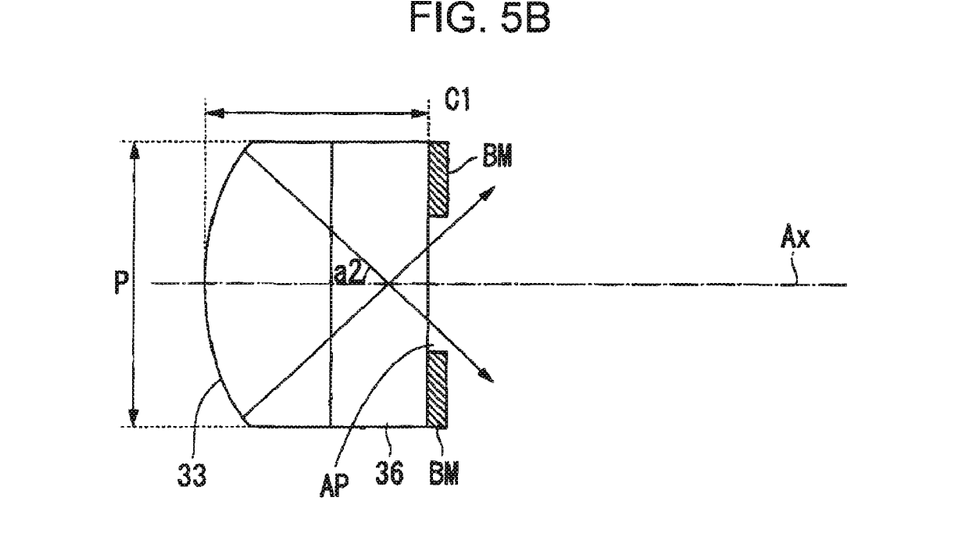
FIG. 5B is an explanatory diagram of the relationship between collection efficiency and the ratio C/P.

Referring now to FIGS. 5A and 5B, the reason that the collection efficiencies of panels 1 to 6 exhibit a drooping characteristic for changes in the ratio C/P will be described.

As shown in FIGS. 5A and 5B, the shape (particularly, curvature) of the microlens 33 is designed appropriately according to the distances C1 and C2 between the microlens 33 and the black matrix BM. As shown in FIG. 5A, when the distance C1 between the microlens 33 and the black matrix BM is large, the curvature radius R1 of the microlens 33 is designed to be large. This is for the purpose of preventing the light incident on the outer periphery of the lens from being cut off by the black matrix BM. In contrast, as shown in FIG. 5B, when the distance C2 between the microlens 33 and the black matrix BM is small, the curvature radius R2 of the microlens 33 is designed to be small. This is for the same purpose as the above. In FIGS. 5A and 5B, the optimum shape of the microlens 33 is changed with the distance between the microlens 33 and the black matrix BM. Also when the distance between the microlens 33 and the black matrix BM is fixed and the diagonal length P of the pixel is changed, the optimum shape of the microlens 33 is changed because of the same reason. Thus, the shape of microlens 33 depends on the ratio C/P of the distance C (C1 and C2) between the microlens 33 and the black matrix BM to the diagonal length P of the pixel.

However, even if the shape of the microlens 33 is thus optimized, sufficient collection efficiency may not be provided depending on the value of the ratio C/P. This is because collection efficiency also depends on the light incident angle of the projection lens. For example, in the case of FIG. 5B, even when the light incident on the outer periphery of the microlens 33 is condensed to the inside of the black matrix BM, the light does not enter the range of the incident angle of the projection lens if the crossed axes angle of the light and the optical axis AX, so that it does not contribute to display. Conversely, since the light incident on the center of the microlens 33 is excessively refracted, the light at the center of the lens which would be available is cut off at the projection lens, which may cause a loss in light amount. On the other hand, when the curvature of the microlens 33 is small as in FIG. 5A, the angle of refraction at the center of the lens becomes too small that the light diagonally incident on the center of the microlens 33 which would be available cannot be sufficiently refracted. This produces the problem that the light cannot enter the range of the incident angle of the projection lens (that is, the light is cut off at the projection lens).

Accordingly, it is necessary for mounting the microlens 33 not only to optimize the shape of the microlens 33 but also to appropriately design the distance C between the microlens 33 and the black matrix BM in consideration of the relationship with the diagonal length P of the pixel. In other words, there is a close correlation between the ratio C/P and the collection efficiency when the shape of the microlens 33 is optimized on the basis of the distance C and diagonal length P. Accordingly, designing the ratio C/P in a specified range provides highest collection efficiency. For example, referring to FIG. 4, with a ratio C/P of 0.5 or less, when the microlens 33 has the structure of FIG. 5A, the light that diagonally enters the center of the microlens 33 is cut off at the projection lens, causing a large loss in light amount. On the other hand, with a ratio C/P of 3 or more, when the microlens 33 has the structure of FIG. 5B, the light that is refracted at a large angle by the outer periphery of the microlens 33 is cut off at the projection lens, causing a large loss in light amount. In contrast, with a ratio C/P of 0.5<C/P<3, the angle of refraction of the light at the center and around outer periphery of the microlens 33 is well balanced, resulting in the smallest loss in light amount.

Second Embodiment

Figure 6:
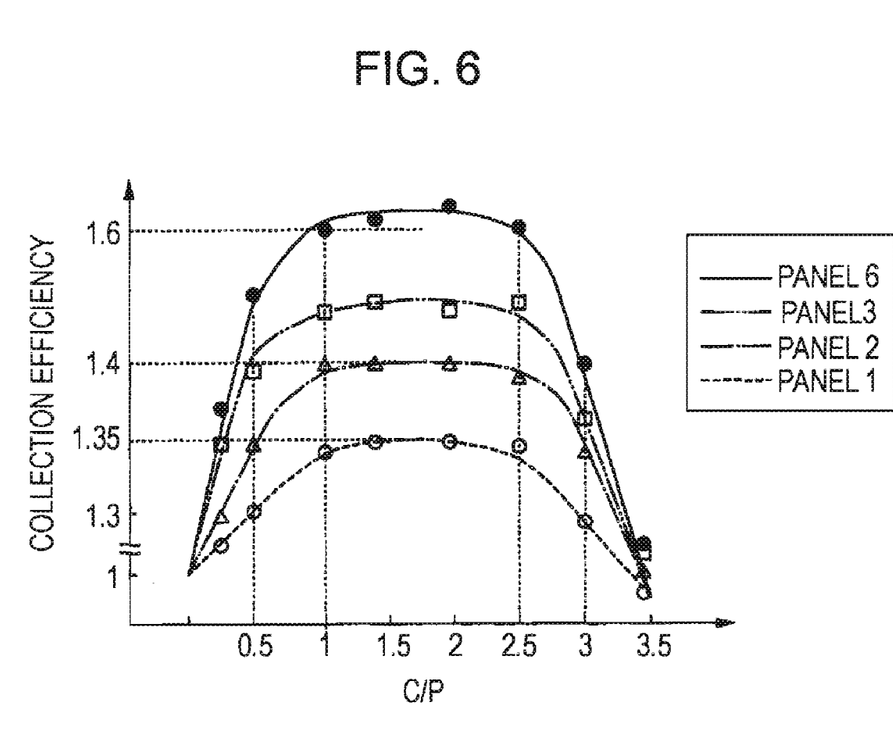
FIG. 6 is a graph showing the actual measurements of the collection efficiency.

FIG. 6 shows the actual measurements of the collection efficiency of the liquid crystal panels manufactured on the basis of the simulations of FIG. 4. In this embodiment, the panels 1, 2, 3, and 6 of FIG. 4 are changed in ratio C/P to form eight panels, and the actual measurements of the collection efficiency of the panels and the simulation results of FIG. 4 are compared. In FIG. 6, the voided dots indicate actual measurements, and the dotted line and so on indicate the simulation results of FIG. 4.

FIG. 6 shows that the simulation results and the actual results are almost the same, and that the highest collection efficiency and a stable characteristic are provided in the range of 1<C/P<2.5. This results shows that the above range is effective not only for the simulations but also for experiments.

Liquid Crystal Panel 2

Figure 7:
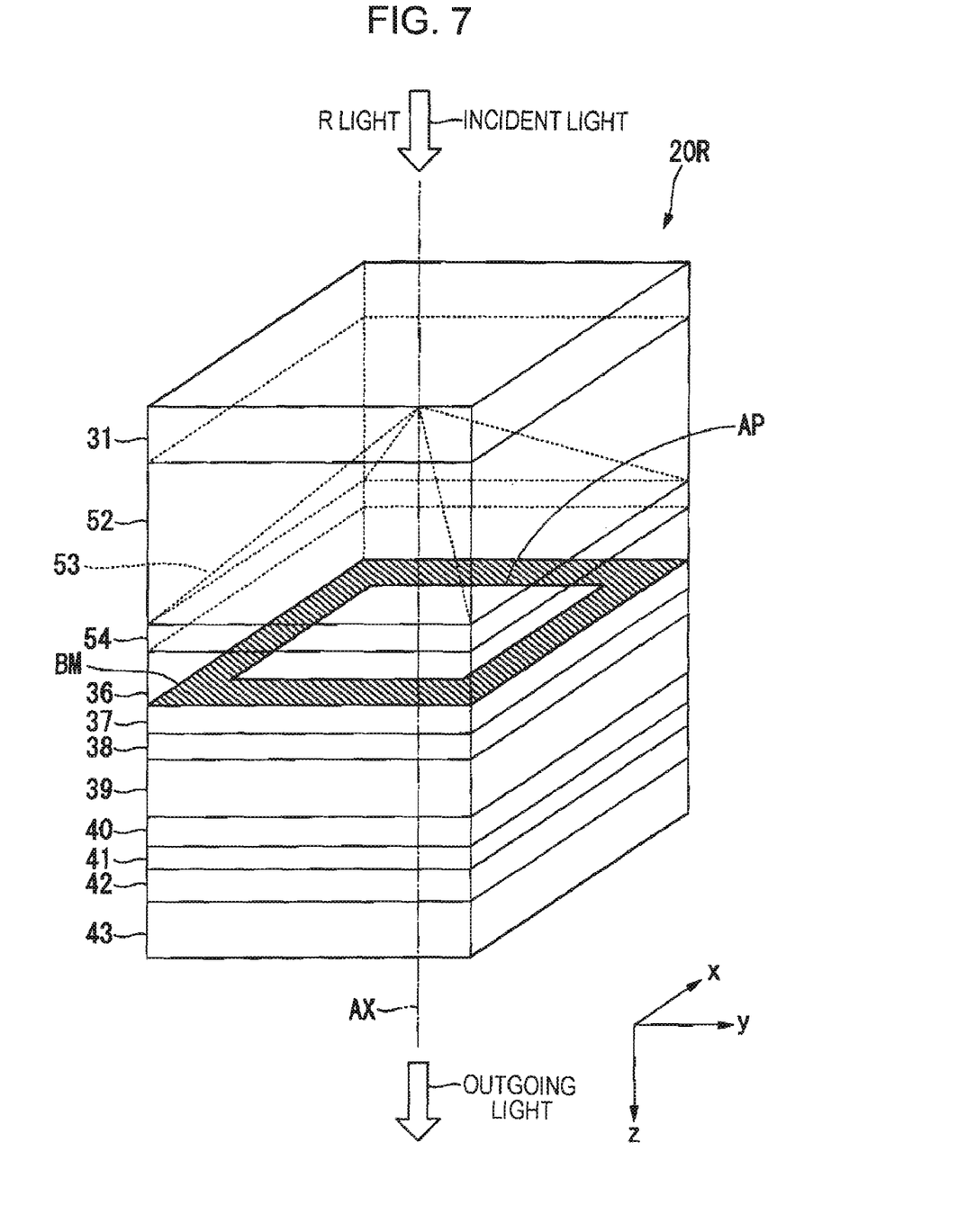
FIG. 7 is a partial perspective view showing the structure of a pixel of the liquid crystal device of a second embodiment.
Figure 8:
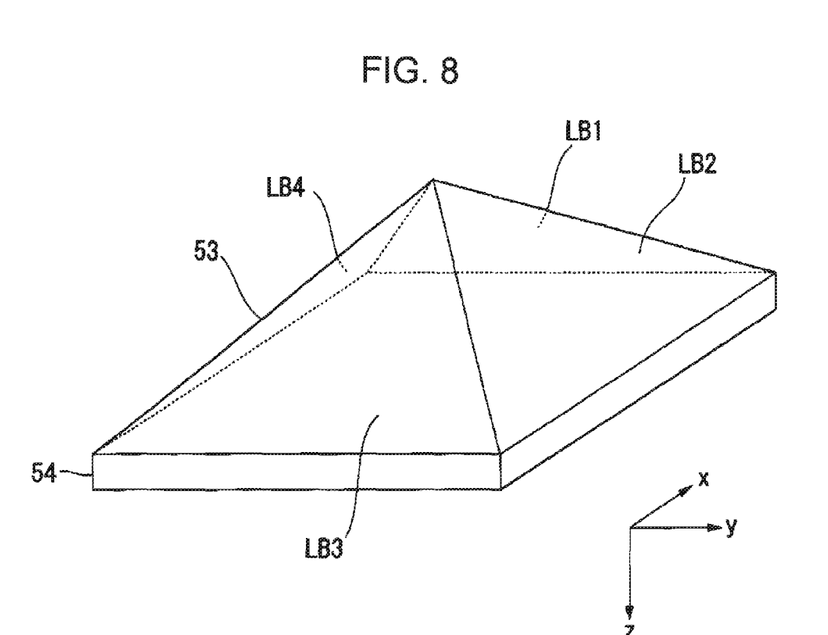
FIG. 8 is a perspective view of a condenser.
Figure 9:
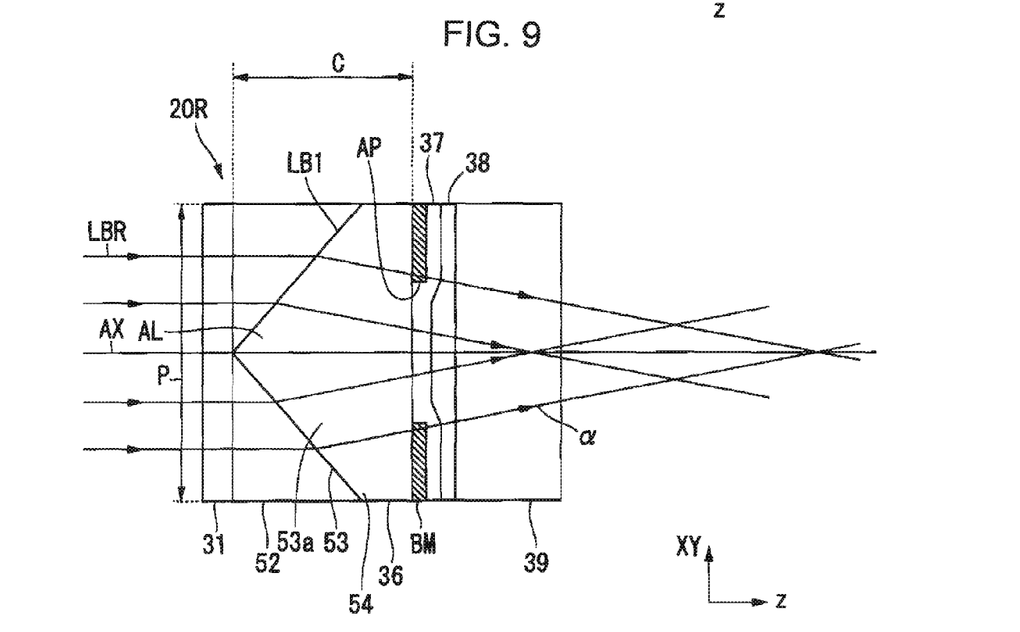
FIG. 9 is a schematic cross sectional view for describing the operation of the condenser.

Referring to FIGS. 7 to 9, a liquid crystal panel according to a second embodiment of the invention will be described.

FIG. 7 is a schematic perspective view showing the structure of the essential part of the liquid crystal panel of the embodiment. The liquid crystal panel has the same basic structure as that of the first embodiment, and is different only in that a microprism 53 is used as a condenser in place of the microlens 33. Accordingly, components common to the first embodiment are given the same numerals and a further description is omitted here.

As shown in FIG. 7, there is a microprism array substrate 52 on the exiting side of the incident-side glass dustproof plate 31. The microprism array substrate 52 is bonded to the opposing substrate 36 with an adhesive layer 54. The surface of the microprism array substrate 52 adjacent to the opposing substrate 36 has a concave surface. The microprism 53 which is a dioptric element is formed of the adhesive layer 54 disposed in the concave surface.

The microprism 53 is disposed for one open area AP. The microprism 53 functions as a condenser for collecting the light rays emitted from the light source 11 into a corresponding open area AP. For the whole liquid crystal panel 25R, multiple microprisms 53 are disposed in matrix form for multiple open areas AP. The multiple microprisms 53 arranged in matrix form constitute a microprism array.

FIG. 8 shows the schematic structure of the microprism 53.

The microprism 53 is in the shape of a quadrangular pyramid having a substantially square bottom. Thus, the microprism 53 has four refracting interfaces of slopes LB1, LB2, LB3, and LB4. The refracting interfaces are slopes such that cross sections taken along planes parallel to the optical axis AX are inclined at a given angle with respect to the optical axis AX.

Referring to FIG. 9, the structure and operation of the microprism 53 will be described.

FIG. 9 is a schematic diagram of the structure from the incident-side dustproof plate 31 to the liquid crystal layer 39 of the liquid crystal panel 25R.

Substantially parallel incident light rays are refracted by the interface between the microprism array substrate 52 and the adhesive layer 54. The slopes LB1, LB2, LB3, and LB4 of the microprism 53 form an angle of inclination θ with the surface of the opposing substrate 36. For example, light LBR incident on the slope LB1 passes through the open area AP by the refraction of the slope LB1 and enters the liquid crystal layer 39 at an incident angle α. The shape of the microprism 53 (the shape of the concave surface or the refracting interface), the refractive index of the microprism array substrate 52, and the refractive index of the adhesive layer 54 are appropriately set so that refracted light can efficiently pass through the open area AP.

The distance C between the microprism 53 and the black matrix BM is designed to an appropriate value according to a pixel pitch P. Specifically, the distance C is designed so that the ratio C/P of the distance C to the diagonal length P of the pixel satisfies 0.5<C/P<3, and more preferably, 1<C/P<2.5 where C is the distance from the rear surface of the microprism 53 (that is, the point on the optical axis AX closest to the light-incident side of the microprism 53) to a point on the optical axis AX of the black matrix BM. The reason is the same as that for the first embodiment. That is, the microprism 53 offers the same advantages as those of the microlens 33 except that it reflects light (totally) to guide the light to the open area AP of the black matrix BM. Accordingly, also with the microprism 53, there may be a close correlation between the ratio C/P and the collection efficiency when the shape of the microprism 53 is optimized on the basis of the distance C and diagonal length P. Thus, the installation position for the microprism 53 can be optimized on the basis of the ratio C/P of the distance C between the microprism 53 and the black matrix BM to the diagonal length P of the pixel, and the optimum range can be determined as for the installation of the microlens 33. This enables higher-definition liquid crystal devices to display light images with high collection efficiency.

While the invention has been described for the preferred embodiments with reference to the drawings, it is to be understood that the invention is not limited to those embodiments. The shapes and combinations of the components described in the above embodiments are only examples and various modifications can be made on design requests without departing from the spirit and scope of the invention.

For example, the foregoing embodiments show two cases: a case in which the cross section of the condenser taken along a plane parallel to the optical axis is curved (the first embodiment); and a case in which the cross sections of the condenser taken along planes parallel to the optical axis AX are inclined at a given angle with respect to the optical axis (the second embodiment). However, the shape of the condenser is not necessarily limited to those but a combination of the two shapes may be used.

In the foregoing embodiments, the invention is applied to a transmissive spatial-light modulator; the invention can be applied to a reflective spatial-light modulator or a mirror spatial-light modulators and also to an image pickup device.

What is claimed is:

1. A liquid crystal device that displays an image through a liquid crystal, the liquid crystal device comprising:
   a plurality of pixels that constitutes the image;
   a light-shielding film disposed between the plurality of pixels;
   an opening provided at the light-shielding film;
   an open surface including the opening; and
   a plurality of condensers provided for the plurality of pixels, the condensers collecting light rays incident on the liquid crystal into the center of the respective pixels, wherein
   a ratio C/P satisfies the relation 1<C/P<2.5 where P is the diagonal length of the pixel, C is the distance between A and B, where A is the intersection point between the optical axis of the light incident on the center of the pixel and the open surface, and B is the farthest point of the condenser on the optical axis from the intersection point A.

2. The liquid crystal device according to claim 1, wherein the condenser has a refracting interface on the cross section taken along a plane including the optical axis, the refracting interface is linear around the outer periphery adjacent to the light incident side of the condenser.

3. A projector comprising the liquid crystal device according to claim 1 as a spatial-light modulator.

* * * * *